United States Patent
Maad et al.

(10) Patent No.: US 11,029,420 B2
(45) Date of Patent: *Jun. 8, 2021

(54) IONIZING RADIATION DETECTING DEVICE

(71) Applicant: BEAMOCULAR AB, Uppsala (SE)

(72) Inventors: Kristofer Maad, Uppsala (SE); Mauritz Andersson, Uppsala (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/830,522

(22) Filed: Mar. 26, 2020

(65) Prior Publication Data

US 2020/0284919 A1    Sep. 10, 2020

Related U.S. Application Data (63) Continuation of application No. 15/882,050, filed on Jan. 29, 2018, now Pat. No. 10,605,929, which is a continuation of application No. 14/635,325, filed on Mar. 2, 2015, now Pat. No. 9,880,291.

(51) Int. Cl.
  *G01T 1/185* (2006.01)
  *G01T 1/29* (2006.01)
  *G01T 1/17* (2006.01)

(52) U.S. Cl.
  CPC .......... *G01T 1/185* (2013.01); *G01T 1/17* (2013.01); *G01T 1/2935* (2013.01)

(58) Field of Classification Search
  CPC ......... G01T 1/185; G01T 1/2935; G01T 1/17; H01J 47/02; H01J 43/04
  USPC .......................... 250/374, 385.1, 207, 370.09
  See application file for complete search history.

(56) References Cited

U.S. PATENT DOCUMENTS

| 3,971,942 A | 7/1976 | Seidman et al. |
|---|---|---|
| 3,976,905 A | 8/1976 | Seidman et al. |
| RE31,371 E | 9/1983 | Kuroishi |
| 6,011,265 A | 1/2000 | Sauli |
| 6,198,798 B1 | 3/2001 | Sauli |
| 7,858,949 B2 | 12/2010 | Bolotnikov et al. |
| 9,880,291 B2 | 1/2018 | Maad et al. |

(Continued)

FOREIGN PATENT DOCUMENTS

| WO | WO 2007/061235 A1 | 5/2007 |
|---|---|---|
| WO | WO 2009/061235 A1 | 3/2009 |

(Continued)

OTHER PUBLICATIONS

Notification of Transmittal of International Search Report and Written Opinion of the International Searching Authority for PCT/EP2016/054429, dated Jun. 15, 2016, 1 page.

(Continued)

*Primary Examiner* — Blake C Riddick
(74) *Attorney, Agent, or Firm* — The Marbury Law Group PLLC (57) ABSTRACT

The invention relates to a detecting unit for detecting ionizing radiation. The device comprises a converter unit for the amplification of ionizing radiation and a read-out unit, wherein the converter unit comprises a converter and a gas-electron multiplier, wherein said converter comprises a substrate with an ionizing radiation-receiving major surface and an electron-emitting major surface and a stack of accelerator plates in contact with the electron-emitting major side, wherein said stack comprises a plurality of perforated accelerator plates wherein the perforations of the perforated accelerator plates are aligned to form a matrix of blind holes.

19 Claims, 4 Drawing Sheets

(56) References Cited

U.S. PATENT DOCUMENTS

| | | |
|---|---|---|
| 10,605,929 B2 | 3/2020 | Maad et al. |
| 2002/0149305 A1 | 10/2002 | Danielsson et al. |
| 2008/0283725 A1 | 11/2008 | Hahn et al. |
| 2009/0084972 A1 | 4/2009 | Tamagawa et al. |
| 2009/0261265 A1 | 10/2009 | Hahn et al. |
| 2010/0252744 A1 | 10/2010 | Herrmann et al. |
| 2010/0295604 A1 | 11/2010 | Hente |
| 2011/0024616 A1 | 2/2011 | Pringle |
| 2011/0089042 A1 | 4/2011 | De Oliveira et al. |
| 2011/0133055 A1 | 6/2011 | Andrews et al. |
| 2011/0147600 A1 | 6/2011 | Spahn |
| 2011/0155919 A1 | 6/2011 | Tokanai et al. |
| 2012/0018642 A1 | 1/2012 | Fukuda et al. |
| 2012/0261585 A1 | 10/2012 | De Oliveira |
| 2013/0068957 A1 | 3/2013 | Stephan et al. |
| 2015/0060685 A1 | 3/2015 | Maad et al. |
| 2015/0380224 A1 | 12/2015 | Fushie |
| 2016/0170078 A1 | 6/2016 | Yaish et al. |
| 2016/0259065 A1 | 9/2016 | Maad |

FOREIGN PATENT DOCUMENTS

| | | |
|---|---|---|
| WO | WO 2014/146673 A1 | 9/2014 |
| WO | WO 2015/034419 A1 | 3/2015 |

OTHER PUBLICATIONS

Written Opinion of the International Searching Authority for PCT/EP2016/054429, dated Jun. 15, 2016, 7 pages.
International Search Report of the International Searching Authority for PCT/EP2016/054429, dated Jun. 15, 2016, 6 pages.

IONIZING RADIATION DETECTING DEVICE

TECHNICAL FIELD

The present invention relates to a detecting device for ionizing radiation, converter units for such devices, as well as converters and gas electron multipliers for such converter units.

BACKGROUND OF THE INVENTION

In the medical field ionizing radiation has many diagnostic and therapeutic uses. It can be used for imaging the body of a patient for example to detect tumors and it can also be used for the treatment of a patient for example to irradiate detected tumors. In order to obtain good resolution images and accurately placed treatment it is necessary to detect the ionizing radiation after it has passed through the body being examined or treated and then process the signals obtained for the detecting means. The signals can be processed to obtain an image which represents the body through which it has passed and/or which represents the distribution of the ionizing radiation. In general the term "imaging" means forming an image of the measured data, and the term "dosimetry" measurement of the absorbed dose due to incident ionizing radiation.

Figure 1A:
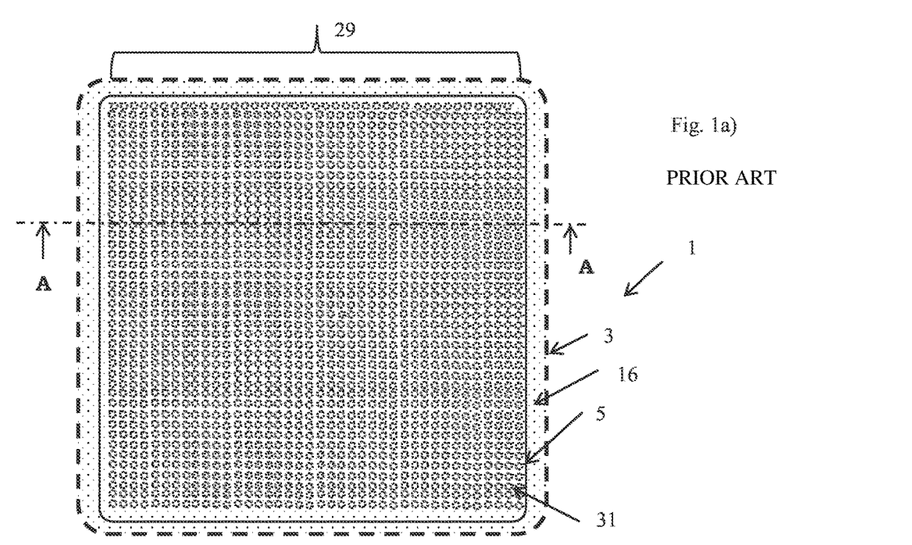
FIG. 1a) shows schematically a view from above of a detecting unit according to the prior art.
Figure 1B:
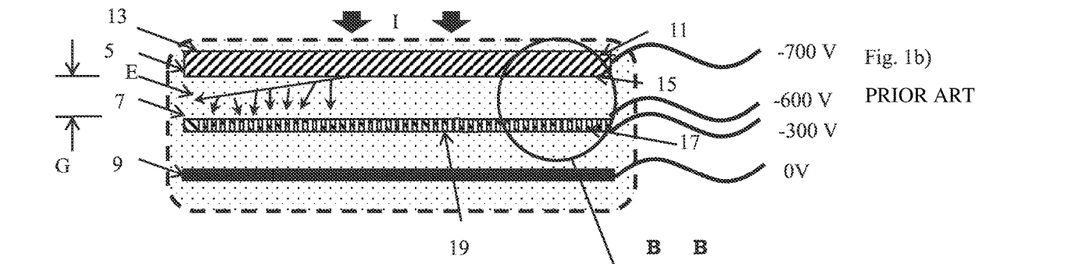
FIG. 1b) shows schematically a section through line A-A of the unit of FIG. 1a).
Figure 1C:
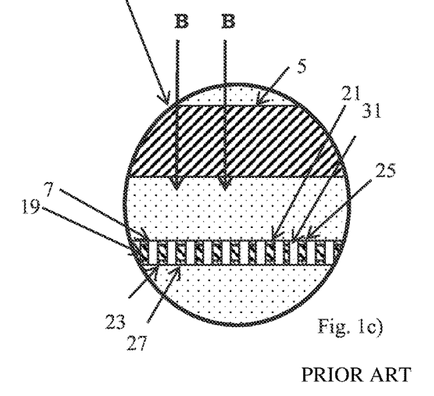
FIG. 1c) shows schematically an enlargement of part of the section of FIG. 1b).
Figure 1D:
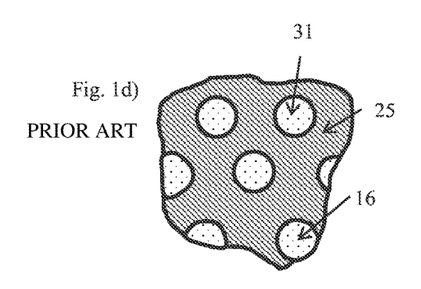
FIG. 1d) shows schematically the view from line B-B of FIG. 1c).

In order to detect in real time the intensity and spatial distribution of incoming ionizing radiation such as high energy photons generated in X-ray imaging or treatment devices, digital detecting units have been developed which convert the incoming radiation, for example photons, into electrons. This can be achieved by electromagnetic interaction with the photons and matter which can cause some of the energy of the photon to be transferred to the matter and a free electron to be excited. Devices within a detecting unit which achieve this effect are called converters. Solid converters rely on the interaction of the incident photons with a solid sheet of material to generate electrons by the Compton Effect or pair production. Gas converters rely on the interaction of incident photons with a gas in a chamber to generate electrons. An example of a prior art unit is known from PCT patent application WO2007/061235. A simplified example of a digital detecting unit (1) is shown in FIGS. 1a) to 1d). This device comprises a housing (3) (shown in dashed lines) filled with a gas (16). The housing contains a converter (5), a GEM (7) separated from the converter by a gas filled gap of depth G, and a read-out unit (9). The converter is formed from a substrate of metal (11). The substrate has a first major face (13) which faces incident ionizing radiation I. This incident radiation causes the formation of electrons in the substrate and these electrons travel through the substrate towards the second major face (15) of the substrate. Electrons which pass through the substrate and impact with the gas molecules in the gas-filled gap cause ionization of the gas molecules and the production of secondary electrons. These electrons need to be multiplied in order to achieve a detectable signal. One way of performing electron multiplication is by providing a micro-pattern gas amplification device (MPGAD) such as a gas-electron multiplier (GEM) (7) of the type developed by CERN, separated from the second major face of the converter by the gas-filled gap of depth G. The GEM comprises a thin, insulating, perforated gas electron multiplication foil (17). Typically the foil is made of an insulating substrate (19) of polyimide polymer poly-oxydiphenylene-pyromellitimide, usually called "Kapton®", that is coated on both major sides (21, 23) with a coating (25, 27) made of a conducting material such as copper. The perforations in the foil form a regular matrix (29) of GEM through holes (31) which extend between the major sides (21, 23) and which form a grid of equidistantly-spaced GEM through holes over substantially the whole of the major surfaces. A potential difference can be placed across the coatings (25, 27) thereby generating an electric field in the GEM through holes which electrical field guides electrons from the converter into the GEM through holes (19). The electrical field generated in the gas in the through holes initiates electron avalanches which increase the number of electrons leaving each through hole. The number of electrons generated in the avalanche can be in the range of 100-1000 per incoming electron. These electrons can be collected and the position and intensity of the incident radiation determined by processing signals generated in the read-out unit which could be, for example a thin film transistor. The electrical fields necessary to ensure the electrons are guided to the read-out unit can be achieved by connecting the converter to a high negative potential, for example −700 V, the upper surface of the GEM to a medium negative potential, for example −600 V, the lower surface of the GEM to a lower negative potential e.g. −300 V and the read-out unit to ground. In order to achieve a large amplification of the electrons leaving the converter it is necessary to have a large potential difference between the converter and the GEM. However if the potential difference is too high then there is a risk of electrical discharges in the form of sparking between the converter and the GEM.

A problem with the prior art devices is that high energy electrons which leave the electron-emitting face of the converter with a large lateral vector will collide with many gas molecules as they travel laterally in the gas gap between the converter and the GEM. These gas molecules will generate electrons, some of which will travel to the GEM and be multiplied by the GEM in a through hole which is not directly under the arrive point of the incident ionizing radiation on the first major face of the substrate which gave rise to the high energy electron and thus will an erroneous position of the incident ionizing radiation when they are detected by the read-out unit. These give rise to errors in the signals produced by the rad-out unit and lead to decreased accuracy and resolution in images of the incident radiation Another problem which can occur is that a large GEM acts as a capacitor which leads to unwanted electrical fields and the possibility of dangerous charges becoming stored in the device.

BRIEF DESCRIPTION OF THE INVENTION

The present invention relates to detecting devices which comprise a converter unit which overcomes one or more of the problems in the prior art by providing a new type of converter and a GEM matched to the converter. In one embodiment of the invention this is achieved by matching the position of the through holes in the GEM with the positions of the blind holes in the converter to reduce the risk of electrical discharges between these two components. In a further embodiment of the invention a reduction in the risk of discharges between the two components is achieved by dividing the copper coatings on the GEM into segments.

DETAILED DESCRIPTION OF THE INVENTION

Figure 2A:
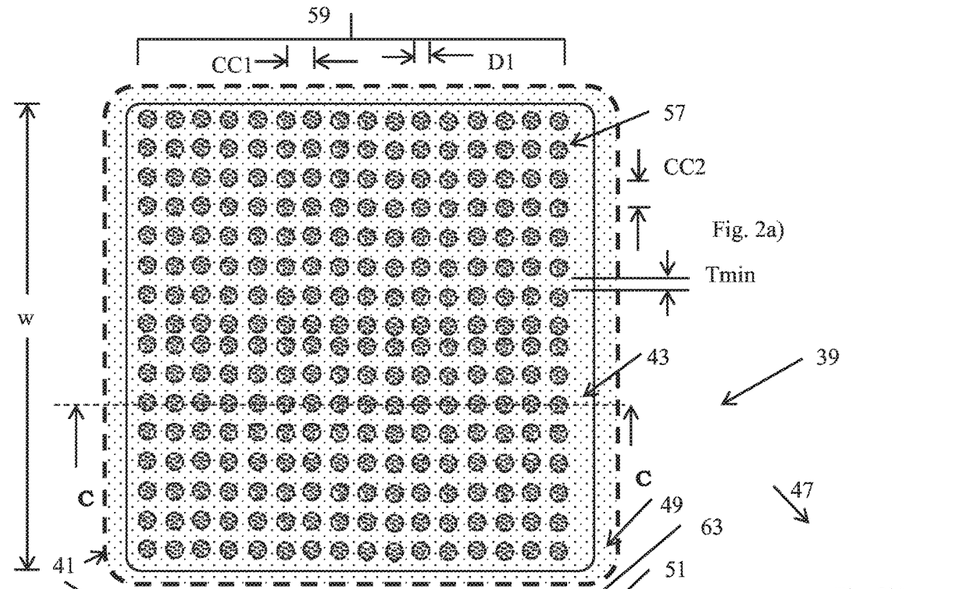
FIG. 2a) shows schematically a view from above of an embodiment of an detecting unit according to the present invention.
Figure 2B:
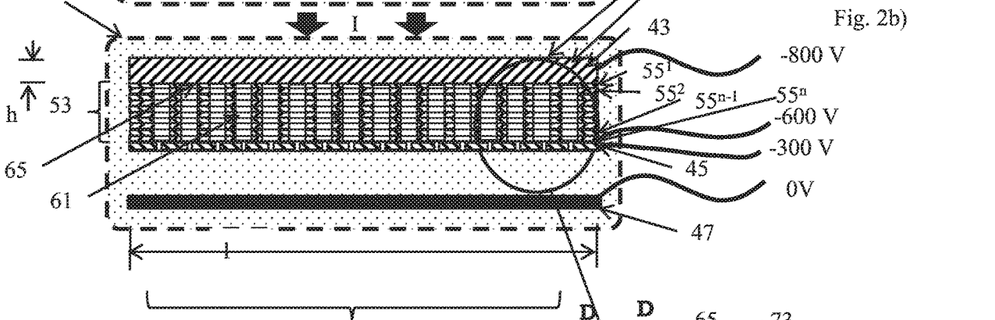
FIG. 2b) shows schematically a section through line C-C of the unit of FIG. 2a).
Figure 2C:
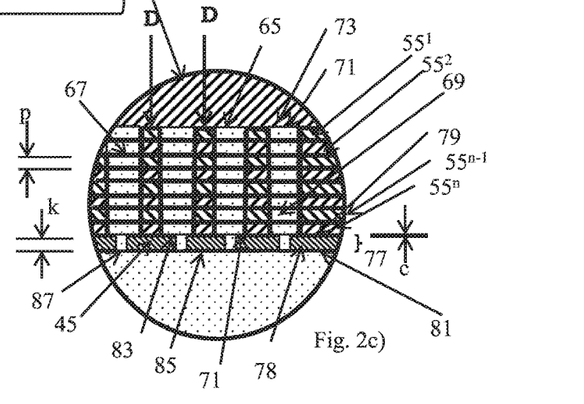
FIG. 2c) shows schematically an enlargement of part of the section of FIG. 2b).
Figure 2D:
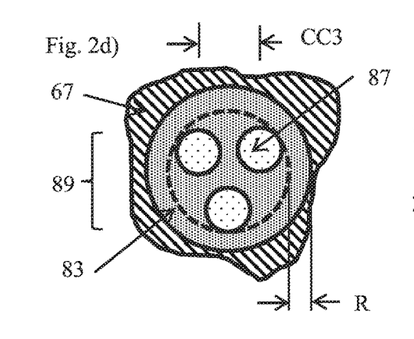
FIG. 2d) shows schematically the view from line D-D of FIG. 1c).

An example of a detecting unit (39) in accordance with an embodiment of the present invention is shown in FIGS. 2a) to 2d). This detecting unit (39) comprises a housing (41), shown by dashed lines, containing a converter unit (comprising a converter (43), a gas-electron multiplier (GEM) (45)), and a read-out unit (47) which generates signals relating to the position and intensity of electrons which interact with it. Signals generated in the read-out unit can be collected by a signal processing system (not shown) which may convert the signals into images. The housing is filled by a gas (49). Preferably the gas is a mixture of gases, preferably a Penning gas mixture, for example a mixture of argon-xenon or neon-argon.

The converter (43) is formed of a solid substrate (51) and a stack (53) formed of a plurality of perforated accelerator plates ($55^1$-$55''$), which have their perforations (57) aligned to form a regular matrix (59) of gas-filled blind holes (61). The solid substrate is made of a suitable metal, for example tungsten, chromium, copper, rhenium, molybdenum, tantalum, iron, steel, or made of an alloy of such metals. It has a height h, width w and length l, and has an ionizing radiation-receiving major surface (63) upon which ionizing radiation I may be incident, and an electron-emitting major surface (65) from which electrons may be emitted.

Figure 3:
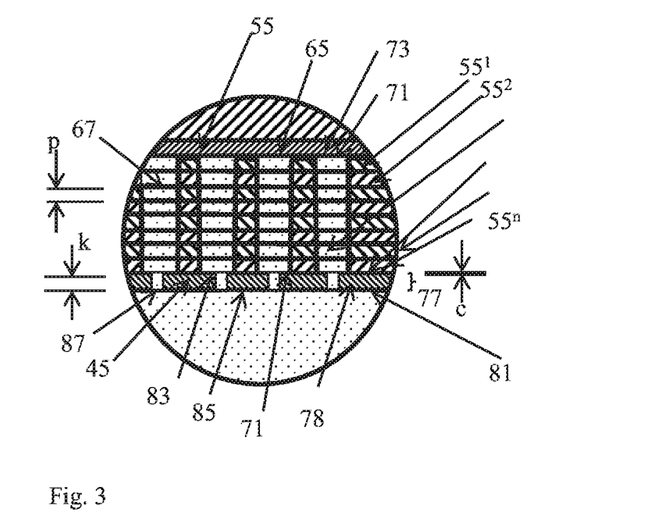
FIG. 3 shows schematically a view corresponding to that of FIG. 2c) for another embodiment of a digital detecting unit in accordance with the present invention.

In the embodiment of a converter shown in FIGS. 2a) to 2d) the electron-emitting major surface (65) of the converter is in electrically-insulated contact with the stack (53) of perforated accelerator plates ($55^1$-$55''$). FIG. 3 shows an alternative arrangement of a converter according to the present invention in which a non-perforated plate (55), preferably made of the same material as the accelerator plates or a material with a similar coefficient of expansion as the accelerator plates, is provided between the electron-emitting major surface (65) of the substrate and the stack of accelerator plates. This non-perforated plate is in electrical contact with the substrate and is electrically insulated from the stack and serves to reduce mechanical stress at the interface between the bulk of the converter and the stack when the device heats up during use. In all other respects the converter shown in FIG. 3 is identical to that of FIG. 2 and the same references number are used to represent identical features in both embodiments.

Preferably in all embodiments of a converter according to the present invention the number n of accelerator plates is greater than or equal to 2 and less than or equal to 100. More preferably the number n of accelerator plates is greater or equal to 10 and less than or equal to 50. Most preferably the number n of accelerator plates is greater or equal to 15 and less than or equal to 30. The accelerator plates are made of conducting material, preferably a metal such as stainless steel, which is sufficiently dense and thick enough to attenuate and/or absorb scattered electrons which have a significant lateral vector. The individual accelerator plates that form the stack may be joined together by electrostatic forces of attraction and/or by an adhesive which may be provided completely or partly over the contact area between adjacent plates. The stack may be connected to the electron-emitting major surface of the substrate by any of the methods used to join the accelerator plates together. Mechanical fasteners or clamps may also be used to hold the accelerator plates together and/or the accelerator plates to the substrate.

The arrangement of the blind holes in the matrix may be quadratic (as shown in the figures)—where each hole (except of course the holes nearest the edges of the plates) is surrounded by four equally spaced holes, or staggered—where each blind hole is surrounded by six equally spaced blind holes. Preferably the blind holes have a diameter D1 which is equal to or greater than 0.3 mm and less than or equal to 0.5 mm. The distance between centers CC1 of the blind holes is preferably equal to or greater than 0.45 mm and equal to or less than 0.65 mm, while at the same time the minimum wall thickness Tmin between the blind holes should be equal to or greater than 0.1 mm to ensure attenuation of laterally moving high energy electrons. Thickness Tmin should be less than or equal to 0.5 mm to ensure that the resolution of the device is adequate. Preferably Tmin is equal to or greater than 0.15 and equal to or less than 0.25 mm.

Insulation (67) in the form of a conformal insulating coating, e.g. vapor deposited poly(p-xylylene) polymer such as "Parylene"®, or an insulating film or insulating layer is provided on the accelerator plates to insulate them from one another. Insulation further covers the longitudinally-extending cylindrical surfaces (69) of the blind holes and reflects low energy electrons which contact the cylindrical surfaces back into the through holes. The exposed portion (71) of the electron-emitting major surface which forms the closed end (73) of each blind hole is not electrically insulated and, when connected to a negative potential, serves to attract and neutralize the positive ions formed in the through holes thus preventing these ions from reacting with and neutralizing the electrons leaving the substrate. Other arrangement to attract and neutralize positive ions are also possible, for example a portion of the longitudinally extending wall of each blind hole may be uninsulated, thereby providing a portion of the surface which can attract and neutralize positive ions.

Preferably each accelerator plate has a thickness p which is equal to or greater than 0.05 mm and equal to or less than 0.2 mm. More preferably each plate has a thickness of 0.1 mm+/−0.01 mm. The substrate and each acceleration plate are provided with a respective electrical contact (not shown). These are connectable to an electrical supply (not shown) which is arranged to form an electrical field which increases from negative to positive in the direction from the substrate to the distal accelerator plate ($55''$) in order to accelerate electrons toward the open ends of the blind holes. Preferably the electrical field strength along the blind holes is equal to or greater than 0.5 kV/cm and is less than or equal to 2 kV/cm. More preferably the field strength is 1 kV/cm+/−0.1 kV/cm. For example, if the stack of thickness 2 mm is made of 20 accelerator plates and 20 layers of insulation, then the average thickness per layer of the stack is 0.1 mm and the potential difference between each adjacent accelerator plate of the stack should be in the order of 10 V. For example if the converter is held at a voltage of −800 V, then the first accelerator plate (55$^1$) would be at a voltage of −790 V and the last accelerator plate at a voltage of −600V. The use of a plurality of accelerator plates permits the establishment of a powerful electrical field though substantially the whole length of each blind hole.

The electrical field in the blind holes can be shaped by adjusting the potential difference between each pair of accelerator plates. In one example of adapting the electrical field in converters according to the invention the potential difference between each pair of accelerator plates is the same, i.e. the potential difference drops linearly along the length of a blind hole from the closed end to the open end.

In another example of adapting the electrical field in converters according to the invention the potential difference between each pair of accelerator plates is not the same, e.g. the potential difference drops non-linearly along the length of a blind hole from the closed end to the open end. This non-linearity could be in the form of a small voltage drop between arranged between the first accelerator plate (55$^1$) and the second accelerator plate (55$^2$), a larger voltage drop between the second accelerator plate (55$^2$) and the third accelerator plate (55$^3$), and so on, wherein the voltage drop between each pair of accelerator plates reaches a maximum between the penultimate accelerator plate (55$^{n-1}$) and the last accelerator plate (55$^n$).

In yet another example of adapting the electrical field in converters according to the invention the potential difference between each pair of accelerator plates is the opposite, i.e. the voltage drop is arranged to be largest between the first accelerator plate (55$^1$) and the second accelerator plate (55$^2$), and smallest between the penultimate accelerator plate (55$^{n-1}$) and the last accelerator plate (55$^n$).

In a further example of adapting the electrical field in converters according to the invention the potential difference between each pair of accelerator plates is arranged to be low between the first accelerator plate (55$^1$) and the second accelerator plate (55$^2$), raising to a peak between two intermediate accelerator plates and then falling to a lower potential difference between the penultimate accelerator plate (55$^{n-1}$) and the last accelerator plate (55$^n$).

Incident ionizing radiation, for example photons, is directed to the radiation-receiving major surface of the substrate and generates electrons which enter the closed ends (73) of the blind holes. Electrons which are travelling substantially parallel to the axis of the holes pass though the blind holes and cause ionization of the gas molecules thereby producing secondary electrons. High energy electrons which have significant lateral vectors will pass through the insulation of the cylindrical surfaces of the blind holes and will be absorbed or attenuated by the material of the accelerator plates thus reducing the erroneous effects of these electrons. The electrons leaving the gas-filled blind holes in the direction towards the GEM need to be multiplied in order to achieve a detectable signal. This is achieved by providing a potential difference across the GEM. Preferably this potential difference is equal to or greater than 40 kV/cm and equal to or less than 80 kV/cm.

Any prior art GEM of appropriate size and performance may be used with the converter but in the embodiment of a digital detecting unit according to the invention shown in FIG. 2*a*) to 2*d*) a new type of GEM may be used. An example of such a new GEM (45) comprises a thin, insulating, perforated gas electron multiplication foil (77). The foil is made of an insulating core substrate (78) of, for example, polyimide polymer poly-oxydiphenylene-pyromellitimide, usually called "Kapton®", and is coated on both major sides (79, 81) with a coating (83, 85) made of a conducting material such as copper. The perforations in the foil form GEM through holes (87) which extend between the major sides (79, 81). Preferably the GEM substrate has a thickness k equal to or greater than 40 µm and equal to or less than 60 µm and preferably is 50 µm+/−2 µm. Preferably the conducting material has a thickness c equal to or greater than 3 µm and equal to or less than 7 µm and preferably is 5 µm+/−1 µm. The GEM through holes (87) extend between the major sides of the GEM and have their longitudinal axis parallel with the longitudinal axis of the blind holes in the accelerator plates.

Contrary to the prior art wherein the GEM through holes are evenly distributed, the GEM through holes are arranged as regularly spaced-apart groups (89) of GEM through holes wherein each group comprises a number M, for example, M=3 as shown in FIGS. 2*a*)-2*d*), of GEM through holes, wherein M preferably is greater or equal to 1 and less than or equal to 20. Preferably the groups of GEM through holes are arranged in a matrix at a centre-to-centre distance CC2 which corresponds to the centre-to-centre distance CC1 between the blind holes and each group of GEM through holes is arranged aligned with a respective blind hole. Such groups of GEM through holes, called "active GEM through holes" in the following, act to multiply incoming electrons. It is possible that for production reasons additional groups of GEM through holes may be provided which are not aligned with the blind holes. Such GEM through holes are not intended to multiply incoming electrons and are called "surplus GEM through holes" in the following. Preferably the GEM through holes have a nominal diameter Di greater or equal to 10 µm and less than or equal to 100 µm. More preferably the GEM through holes have a nominal diameter greater than or equal to 30 µm and less than or equal to 90 µm. Even more preferably the GEM through holes have a nominal diameter greater than or equal to 50 µm and less than or equal to 70 µm. Preferably the GEM through holes comprises in a group of GEM through holes have a centre-to-centre spacing CC3 equal to or greater than 20 µm and less than or equal to 200 µm. More preferably the GEM through holes in a group have a centre-to-centre spacing equal to or greater than 50 µm and less than or equal to 180 µm. Most preferably the GEM through holes in a group have a centre-to-centre spacing CC3 which is equal to or greater than 100 µm and less than or equal to 160 µm. Even more preferably the centre-to-centre spacing CC3 is 140 µm+/−2 µm. Preferably every blind hole in the converter leads to a respective group of active GEM through holes.

When a potential difference is provided between the coatings (83, 85) of the GEM by means of the power supply an electric field is generated in the GEM through holes. In order to prevent unwanted discharges between the edge of any GEM through hole and the edge of the open end of a blind hole in an accelerator plate of the converter, the groups of GEM through holes are arranged so that the minimum radial distance R between the circumference of a blind hole in the distal accelerator plate (55$^n$) and the closest point of the circumference of a GEM through hole is preferably equal to or greater than 20 µm. More preferably the minimum radial distance between the circumference of a blind hole in the distal accelerator plate (55$^n$) and the closest point of the circumference of a GEM through hole is equal to or greater than 40 µm. Even more preferably the minimum radial distance between the circumference of a blind hole in the distal accelerator plate (55″) and the closest point of the circumference of a GEM through hole is equal to or greater than 50 µm. The use of a annular region of radial width R in which no GEM through holes are permitted means that in comparison to a prior art GEM with equally distributed GEM blind holes the voltage difference between the converter and the GEM can be increased compared to that used in the prior art. This increase in potential difference may allow a greater electrical field strength and better multiplication of the electrons entering the electrical field.

As an illustrative example of an embodiment of the invention, blind holes of diameter 0.4 mm in a converter are arranged at a centre to centre distance CC1 of 0.5 mm, i.e. the minimum wall thickness between the blind holes would be 0.1 mm. Each group of GEM through holes contains a plurality of GEM through holes of diameter 50 µm. The centre to centre distance of the groups of GEM through holes would be the same as CC1 i.e. it would be 0.5 mm. If the minimum radial distance R between the circumference of a blind hole in the distal accelerator plate and the closest point of the circumference of a GEM through hole is made equal to 50 µm then the centers of the GEM through holes may not be closer than 75 µm to the circumference of the nearest blind hole in the distal accelerator plate. This means that the diameter of the group of GEM through holes, i.e. the diameter of a circle enclosing the group of GEM through holes, would be equal to 0.4 mm−(2×50 µm)=0.3 mm. In the case of a matrix in which the groups of through holes are aligned in a quadratic formation this would mean that each group of GEM through holes would be separated from the nearest neighboring group of GEM through holes by a region devoid of through holes which is a minimum of 0.2 mm wide. Preferably the diameter of a group of GEN through holes is less than or equal to 0.6 mm and greater than or equal to 0.2 mm. More preferably the diameter of a group of GEN through holes is less than or equal to 0.4 mm and greater than or equal to 0.25 mm.

The electrical field generated in the gas in the GEM through holes initiates electron avalanches which increases the number of electrons leaving each hole. The number of electrons generated in an electron avalanche can be in the range of 100-1000 per incoming electron. These electrons can be collected and the position and intensity of the incident radiation determined by the read-out unit (47) which is of conventional design and not described further. Signals regarding the position and intensity of the incident radiation generated in the read-out unit can be collected by a signal processing system (not shown) which converts the signals into images.

Figure 4:
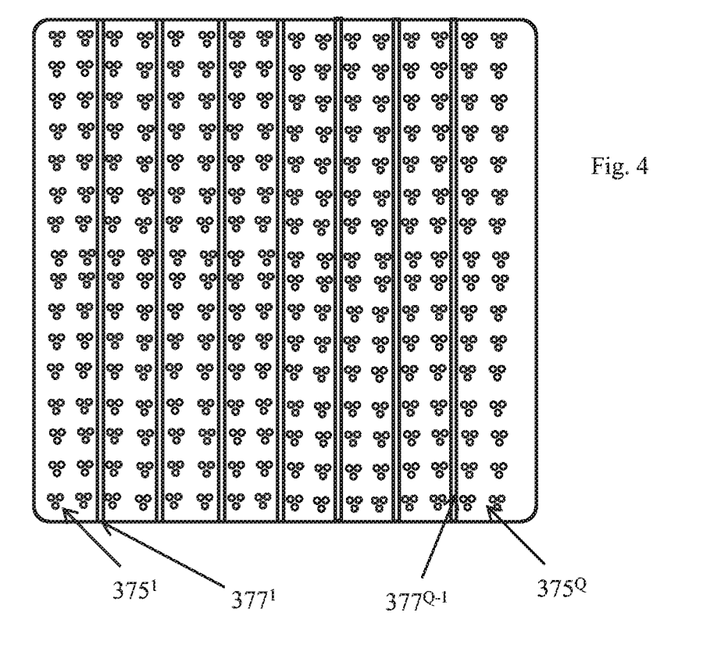
FIG. 4 shows a view from below of a further embodiment of a GEM according to the present invention.

FIG. 4 shows a view from below of further GEM (359) in accordance with the invention. The conducting coating (373) of this visible lower major surface of the GEM is divided into a number Q of electrically-unconnected regions (375$^1$-375$^Q$) by a plurality of grooves (377$^1$-377$^{(Q-1)}$) each of which extend from edge to edge across the surface and which extend through the surface to the underlying electrically insulating substrate. The grooves may be formed by removing conducting coating from the respective surface or, when applying the coating, by preventing coating from being applied where the grooves are to be positioned. These electrically-unconnected regions may each form a capacitor but the total capacitance of the GEM is less than that which would be formed if the conducting coating covered the major surface as a continuous coating.

In a further embodiment of a GEM in accordance with the invention the conducting coating of the upper major surface of the GEM is divided into a number of electrically-unconnected regions in order to achieve the effect of a lower capacitance.

In a another further embodiment of a GEM in accordance with the invention both the conducting coating of the upper major surface and the lower major surface of the GEM are divided into a number of electrically-unconnected regions in order to achieve the effect of a lower capacitance.

The invention is not to be seen as limited by the preferred embodiments described above, but may be varied within the scope of the appended claims as is readily apparent to the person skilled in the art. The various embodiments can be combined with each other in any suitable manner.

What is claimed is:

1. Detecting device for detecting ionizing radiation comprising a converter unit for amplifying electrons emitted due to ionizing radiation and a read-out unit, wherein the converter unit comprises a converter and a gas-electron multiplier, wherein said converter comprises a substrate with an ionizing radiation-receiving major surface and an electron-emitting major surface and a stack of accelerator plates in contact with the electron-emitting major surface, wherein said stack comprises a plurality of perforated accelerator plates wherein perforations of the perforated accelerator plates are aligned with each other and are distributed to form a matrix of blind holes;

wherein said gas-electron multiplier comprises a matrix formed of a plurality of groups of GEM through holes wherein said groups are aligned with a respective blind hole.

2. Detecting device according to claim 1 wherein the gas-electron multiplier comprises a first major surface and a second major surface made of a conducting material and wherein at least one of said first and second major surfaces is formed as a plurality of electrically unconnected regions.

3. Detecting device according to claim 1 wherein the gas-electron multiplier comprises a first major surface and a second major surface made of a conducting material and wherein both of said first and second major surfaces are formed as a plurality of electrically unconnected regions.

4. Detecting device according to claim 1 wherein said gas-electron multiplier comprises a matrix formed of a plurality of groups of GEM through holes wherein a minimum radial distance between a circumference of a blind hole and a closest point of the circumference of a GEM through hole is equal to or greater than 40 µm.

5. Detecting device according to claim 1 wherein the diameter of each blind hole is equal to or greater than 0.3 mm and less than or equal to 0.5 mm.

6. Detecting device according to claim 1 wherein the gas-electron multiplier comprises a first major surface and a second major surface made of a conducting material and wherein at least one of said first and second major surfaces is formed as a plurality of electrically unconnected regions.

7. Detecting device according to claim 1 wherein the gas-electron multiplier comprises a first major surface and a second major surface made of a conducting material and wherein both of said first and second major surfaces are formed as a plurality of electrically unconnected regions.

8. Detecting device according to claim 1 wherein said gas-electron multiplier comprises a matrix formed of a plurality of groups of GEM through holes wherein a minimum radial distance between a circumference of a blind hole and a closest point of the circumference of a GEM through hole is equal to or greater than 40 µm.

9. Detecting device according to claim 1 wherein the diameter of each blind hole is equal to or greater than 0.3 mm and less than or equal to 0.5 mm.

10. Converter unit comprising a converter and a gas-electron multiplier, wherein said converter comprises a substrate with an ionizing radiation-receiving major surface and an electron-emitting major surface and a stack of accelerator plates in contact with the electron-emitting major surface, wherein said stack comprises a plurality of perforated accelerator plates, wherein perforations of the perforated accelerator plates are aligned to form a matrix of blind holes, and wherein said gas-electron multiplier comprises a matrix formed of a plurality of groups of GEM through holes wherein said groups are aligned with a respective blind hole.

11. Converter unit according to claim 10 wherein a surface of each blind hole is covered with an insulator except for a portion which is exposed in order to be able to attract and neutralize ions.

12. Converter unit according to claim 11 wherein said gas-electron multiplier comprises a matrix formed of a plurality of groups of GEM through holes wherein a minimum radial distance between a circumference of a blind hole and a closest point of a circumference of a GEM through hole is equal to or greater than 20 μm.

13. Converter unit according to claim 11 wherein said gas-electron multiplier comprises a matrix formed of a plurality of groups of GEM through holes wherein a minimum radial distance between a circumference of a blind hole and a closest point of a circumference of a GEM through hole is equal to or greater than 40 μm.

14. Converter unit according to claim 11 wherein said gas-electron multiplier comprises a matrix formed of a plurality of groups of GEM through holes wherein a minimum radial distance between a circumference of a blind hole and a closest point of a circumference of a GEM through hole is equal to or greater than 50 μm.

15. Converter unit according to claim 10 wherein said gas-electron multiplier comprises a matrix formed of a plurality of groups of GEM through holes wherein a minimum radial distance between a circumference of a blind hole and a closest point of a circumference of a GEM through hole is equal to or greater than 20 μm.

16. Converter unit according to claim 10 wherein said gas-electron multiplier comprises a matrix formed of a plurality of groups of GEM through holes wherein a minimum radial distance between a circumference of a blind hole and a closest point of a circumference of a GEM through hole is equal to or greater than 40 μm.

17. Converter unit according to claim 10 wherein said gas-electron multiplier comprises a matrix formed of a plurality of groups of GEM through holes wherein a minimum radial distance between a circumference of a blind hole and a closest point of a circumference of a GEM through hole is equal to or greater than 50 μm.

18. Converter for converting ionizing radiation wherein said converter comprises a substrate with an ionizing radiation-receiving major surface and an electron-emitting major surface and a stack of accelerator plates in contact with the electron-emitting major surface, wherein said stack comprises a plurality of perforated accelerator plates wherein perforations of the perforated accelerator plates are aligned to form a matrix of blind holes, and wherein said gas-electron multiplier comprises a matrix formed of a plurality of groups of GEM through holes wherein said groups are aligned with a respective blind hole.

19. Converter according to claim 18 wherein a surface of each blind hole is covered with an insulator except for a portion which is exposed in order to be able to attract and neutralize ions.

* * * * *